United States Patent [19]
Koujiyama et al.

[11] Patent Number: 5,917,520
[45] Date of Patent: Jun. 29, 1999

[54] INK-JET PRINTING APPARATUS

[75] Inventors: Akitomo Koujiyama; Isao Karasawa, both of Tokyo, Japan

[73] Assignee: Mutoh Industries, Ltd., Tokyo, Japan

[21] Appl. No.: 08/795,132

[22] Filed: Feb. 7, 1997

[30] Foreign Application Priority Data

Feb. 9, 1996 [JP] Japan ................................. 8-024400

[51] Int. Cl.$^6$ ............................... B41J 2/145; B41J 2/15; B41J 29/38
[52] U.S. Cl. ................................... 347/41; 347/5
[58] Field of Search .................. 347/41, 9, 12, 347/5, 43

[56] References Cited

U.S. PATENT DOCUMENTS 5,448,269  9/1995  Beauchamp et al. ................. 347/19
5,675,365 10/1997  Becerra et al. .......................... 347/9

*Primary Examiner*—N. Le
*Assistant Examiner*—Thinh Nguyen
*Attorney, Agent, or Firm*—Rabin & Champagne, P.C.

[57] ABSTRACT

In the ink-jet printing apparatus, each nozzle is selected so that time differences of drive timings of adjacent nozzles become random in the entire ink-jet head. Thus, texture noise can be prevented and the picture quality can be improved. In this apparatus, when the time differences of drive timings of adjacent nozzles are 2T, T, 2T, 3T, and so forth, four nozzles in sixteen nozzles set to be enable in one scanning operation are selected in such a manner that time differences of drive timings of adjacent nozzles become random in the entire ink-jet head.

6 Claims, 24 Drawing Sheets

F I G. 2
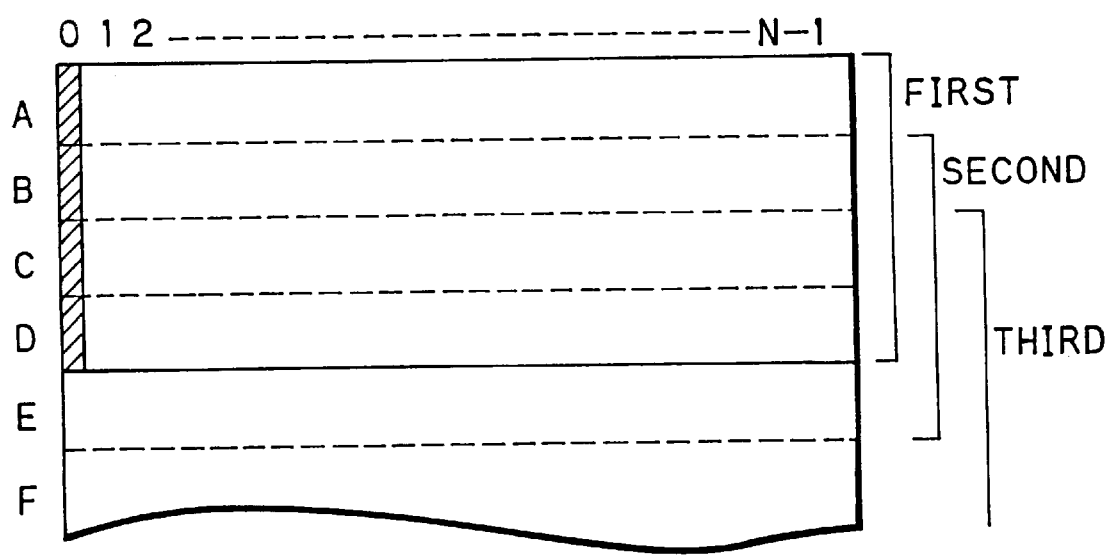

FIG. 3

| SCANNING OPERATION NO. | 4k+1 | 4k+2 | 4k+3 | 4k+4 |
|---|---|---|---|---|
| MASK DATA | 1<br>0<br>0<br>0<br><br>1<br>0<br>0<br>0<br><br>1<br>0<br>0<br>0<br><br>1<br>0<br>0<br>0 | 0<br>0<br>0<br>1<br><br>0<br>0<br>0<br>1<br><br>0<br>0<br>0<br>1<br><br>0<br>0<br>0<br>1 | 0<br>1<br>0<br>0<br><br>0<br>1<br>0<br>0<br><br>0<br>1<br>0<br>0<br><br>0<br>1<br>0<br>0 | 0<br>0<br>1<br>0<br><br>0<br>0<br>1<br>0<br><br>0<br>0<br>1<br>0<br><br>0<br>0<br>1<br>0 | k=0, 1, 2, ...

F I G. 6A
⟨1 2 4 3⟩
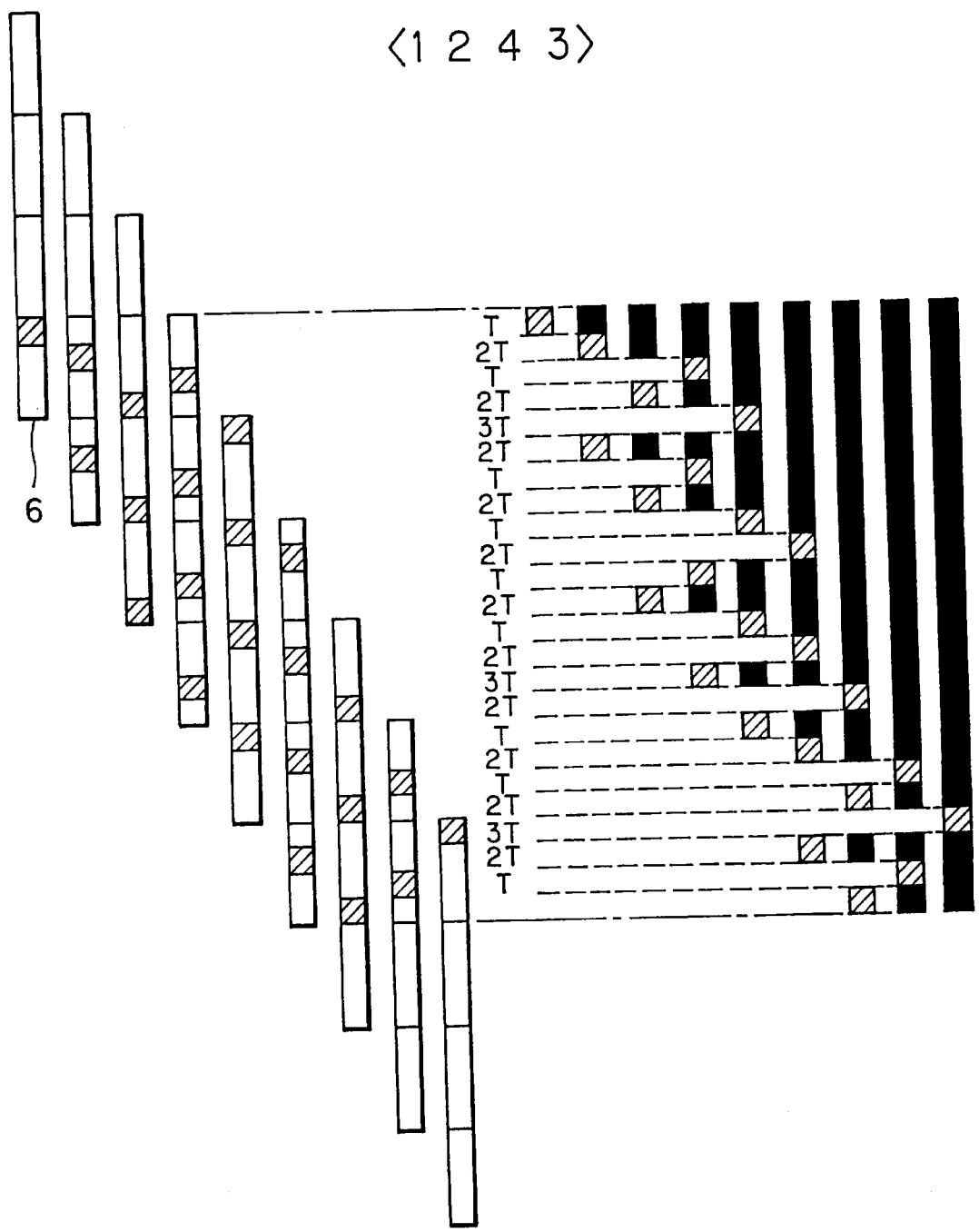

⟨1 3 4 2⟩

⟨2 1 3 4⟩

⟨2 3 1 4⟩

⟨2 4 1 3⟩

⟨2 4 3 1⟩

⟨3 1 2 4⟩

⟨3 1 4 2⟩

⟨3 2 4 1⟩

⟨3 4 2 1⟩

<4 2 1 3>

⟨4 2 3 1⟩

⟨4 3 1 2⟩

FIRST SCANNING

SECOND SCANNING

THIRD SCANNING

FOURTH SCANNING

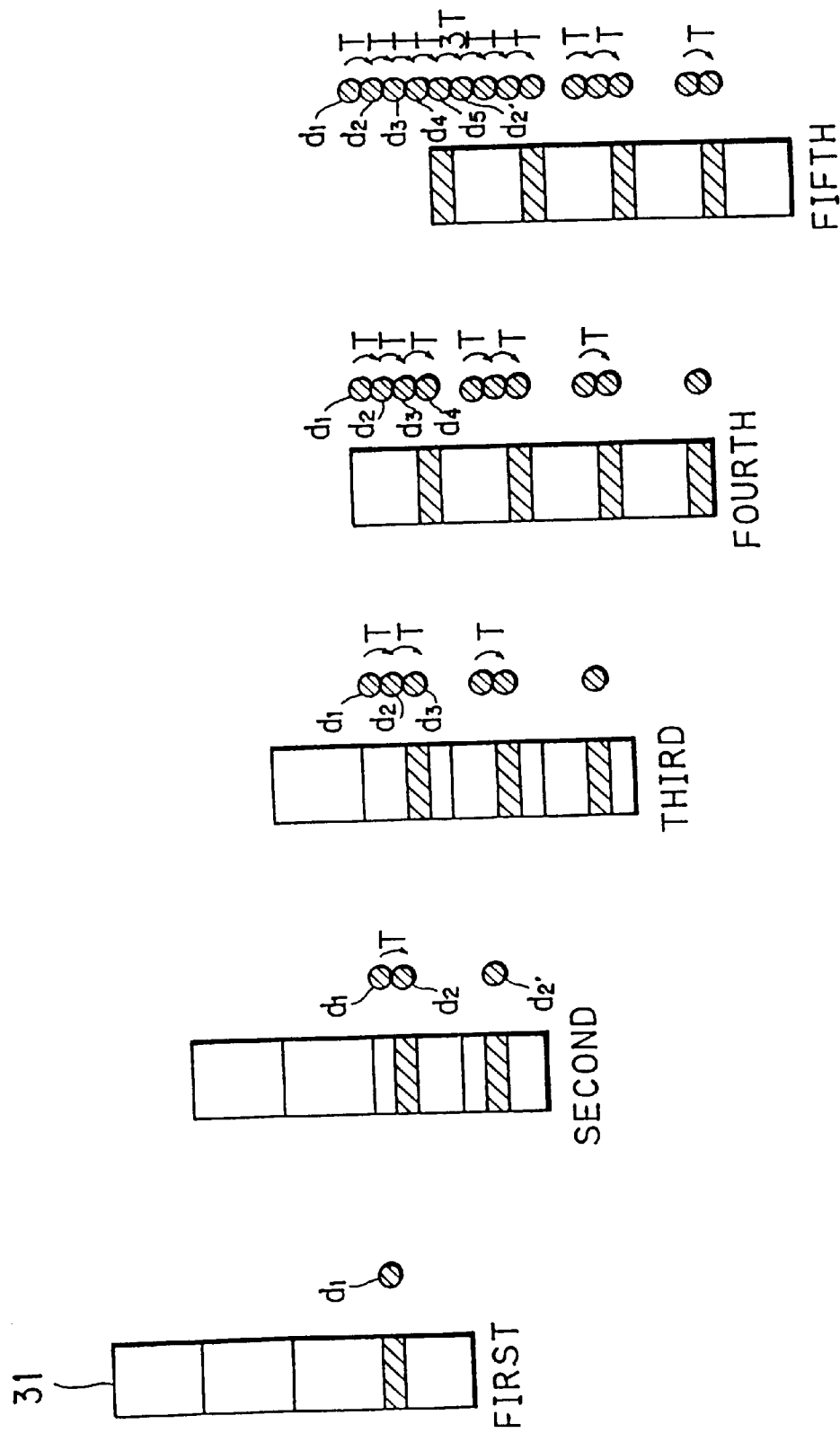

INK-JET PRINTING APPARATUS

BACKGROUND OF THE INVENTION

1. Field of the Invention

The present invention relates to a multi-path type ink-jet printing apparatus, and in particular to, an ink-jet printing apparatus suitable for printing data in full colors.

2. Prior Art

In an ink-jet printing apparatus, when one session of a print scanning operation of an ink-jet head is performed, all nozzles are set to be enabled. The print scanning operation is performed such that the ink-jet head is moved for a length corresponding to the number of nozzles for each print scanning operation in a direction perpendicular to the print scanning direction.

However, this method has the following problem. As shown in FIG. 13, assuming that the band width of which an ink-jet head 31 can print data on a sheet 32 with one print scanning operation is denoted by W, the head 31 prints data in bidirectional directions in such a manner that the head 31 is vertically moved by the band width W whenever each print scanning operation is performed as denoted by arrows (dotted lines). Thus, when output data 33 of the ink-jet head 31 exceeds two or more bands, each band deviates for $\Delta d$ due to the feed deviation and feed error of the head 31. When the band width W is as large as several mm, since such a deviation periodically takes place, the picture quality deteriorates. However, it is known that when such a deviation takes place in a very short period (for example, around 1.5 mm), eyes of human beings cannot substantially recognize it.

Due to this fact, a multi-path method has been used.

In a multi-path type ink-jet printing apparatus, part of all nozzles of the head, which are interspersedly selected, are set to be enable at a time in one print scanning operation. In the multi-path method, data that is to be output in one print scanning operation is printed with a plurality of print scanning operations. At this point, whenever the print scanning operation is performed, the head is slightly moved in the vertical direction.

FIGS. 14 and 15 are schematic diagrams for explaining a four-path type printing method.

As shown in FIG. 14, assuming that the number of nozzles of the ink-jet head 31 is 16 and the first print scanning time is T, in a print scanning operation, nozzles N11, N21, N31, and N41 are enable. In the second print scanning operation, nozzles N12, N22, N32, and N42 are enable. In the third print scanning operation, nozzles N13, N23, N33, and N43 are enable. In the fourth print scanning operation, nozzles N14, N24, N34, and N44 are enable. Thus, in each print scanning operation, four nozzles disposed at intervals of four nozzles are successively selected. As shown in FIG. 15, when each print scanning operation is completed, the head 31 is vertically moved for W/4. After a total of four print scanning operations are completed, data for the band width W is printed. In each scanning operation, even if output dots deviate, the picture quality does not remarkably deteriorate.

Now, as shown in FIG. 16, when one straight line is printed, the time difference after a dot d1 is formed in the first print scanning operation until a dot d2 adjacent to the dot d1 is formed in the second print scanning operation is equivalent to a period T of one print scanning operation. Likewise, dots d3 and d4 formed in the third and fourth print scanning operations are formed the period T time after the dots d2 and d3 adjacent thereto are formed, respectively. However, a dot d5 formed in the fifth print scanning operation is adjacent to both the dot d4 and a dot d2' formed in the second print scanning operation. The time difference between the dot d4 and the dot d5 is T. However, the time difference between the dot d2' and the dot d5 is 3T. In this case, the ink dried state of the dot d2' is different from the ink dried state of the dot d4. Thus, the ink mixed state between the dots d5 and d4 is delicately different from the ink mixed state between the dots d5 and d2'.

FIG. 17 is a schematic diagram showing time differences of adjacent dots formed by the above-described head driving method in a longer range than that in FIG. 16.

As shown in FIG. 17, dots with time differences 3T against adjacent dots regularly take place in relatively large spatial intervals. These dots cause density differences, resulting in a picture deterioration as texture noise.

SUMMARY OF THE INVENTION

An object of the present invention is to provide a multi-path type ink-jet printing apparatus that prevents texture noise and that improves picture quality.

The present invention is a multi-path type ink-jet printing apparatus, comprising an ink-jet head with m nozzles (where m is an integer larger than 2), and a controller for setting only m/n nozzles that are interspersedly selected from the m nozzles (where n is an integer smaller than m and larger than 2) to be enabled in one print scanning operation, relatively moving the ink-jet head for m/n nozzles corresponding to each print scanning operation in the direction perpendicular to the print scanning direction against a record sheet, sequentially changing a nozzle set to be driven, and printing data for the m nozzles with n print scanning operations, wherein the controller selects the m/n nozzles in each print scanning operation in such a manner that the time differences of drive timings of adjacent nozzles of the ink-jet head become random.

The controller comprises a storing circuit for storing output data to be printed by the ink-jet head, an address generating circuit for sequentially shifting an address for m/n dots (where n is an integer that satisfies $m > n \geq 2$) in the direction perpendicular to the print scanning direction whenever each print scanning operation is performed, and generating a read address of the storing circuit so as to read the output data for m dots from the storing circuit, and a masking circuit for interspersedly outputting data for m/n dots of m dots read from the storing circuit addressed by the address generating circuit to the ink-jet head and determining a dot set selected for each print scanning operation so that time differences of forming timings of adjacent dots become random in the ink-jet head.

In a preferred embodying mode of the present invention, the controller selects nozzles in such a manner that when four successive nozzles are denoted by 1, 2, 3, and 4, nozzles 1, 4, 2, and 3 are sequentially selected with four print scanning operations.

According to the present invention, in a multi-path method, m/n nozzles are selected in such a manner that time differences of drive timings of adjacent nozzles become random (for example, 2T, T, 2T, 3T, 2T, T, and so on) in the ink-jet head. Thus, as a result of that inks discharged from nozzles are equally mixed on an entire record medium, the print output becomes free of unevenness of density, whereby the picture quality is improved.

Assuming that successive nozzle numbers are 1, 2, 3, and 4, when dots are formed in the order of the nozzles 1, 4, 2, and 3 in four print scanning operations, the time differences of forming timings of adjacent dots can be randomized in the entire ink-jet head.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a schematic diagram showing the structure of a memory for use with the ink-jet printing apparatus;

FIG. 3 is a table showing an example of mask data according to the embodiment;

FIG. 5 is a schematic diagram showing time differences of drive timings of adjacent nozzles according to the embodiment;

FIGS. 6A and 6B are schematic diagrams showing time differences of drive timings of adjacent nozzles according another embodiment;

FIG. 16 is a schematic diagram showing time differences of drive timings of adjacent nozzles of a conventional ink-jet printing apparatus.

DETAILED DESCRIPTION OF THE PREFERRED EMBODIMENTS

Next, with reference to the accompanying drawings, embodiments of the present invention will be described.

Figure 1:
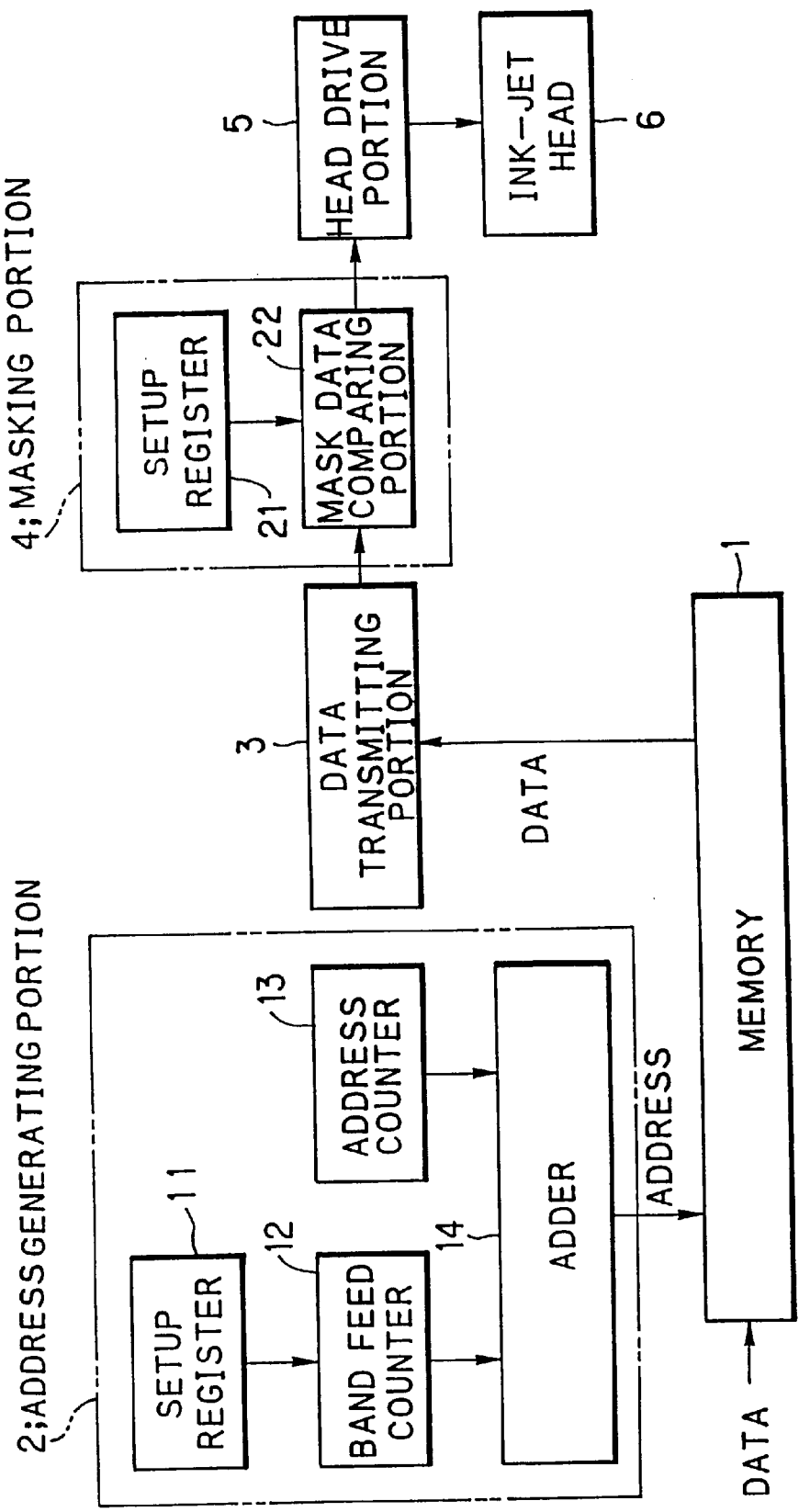
FIG. 1 is a block diagram showing the structure of a four-path type ink-jet printing apparatus according to an embodiment of the present invention.

FIG. 1 is a block diagram showing the structure of a four-path type ink-jet printing apparatus according to an embodiment of the present invention.

Dot data to be printed is stored in a memory 1. Whenever a print scanning operation is performed, output data for m dots addressed by an address generating portion 2 is read from the memory 1 and sent to a masking portion 4 through a data transmitting portion 3. In the masking portion 4, the output data for m/4 dots is interspersedly selected from the transmitted data of m dots, and the dot set is changed in each print scanning operation. Output data of the masking portion 4 is supplied to an ink-jet head 6 through a head drive portion 5. The ink-jet head 6 has m nozzles. Whenever the print scanning operation is performed, the ink-jet head 6 is relatively moved for m/4 nozzles against a record sheet. Nozzle sets to be enable are sequentially changed and data for m nozzles is printed with four bidirectional print scanning operations.

The address generating portion 2 comprises a setup register 11, a band feed counter 12, an address counter 13, and an adder 14. Whenever the print scanning operation is performed, the setup register 11 stores a feed width (=m/4 dots) for which the ink-jet head 6 is moved in a direction perpendicular to the print scanning direction. The band feed counter 12 is reset at a timing of print out starting, and count up for stored data in the set up register 11 after each print scanning operation. The counter value is supplied to the adder 14. On the other hand, whenever the address counter 13 counts m dots, it resets the count value and generates an address of the memory 1. The adder 14 adds the counter value of the band feed counter 12 and the counter value of the address counter 13 to generate a read address of the memory 1 so that output data for m dots are sequentially shifted for m/4 dots to be read whenever each scanning is performed.

FIG. 2 is a schematic diagram showing a storage region of the memory 1 of the apparatus.

Assuming that the number of nozzles of the ink-jet head 6 is 16 (i.e., m=16) and the number of nozzles driven with one print scanning operation is 4 (i.e., m/n=4), output data for 16 dots per address (hatched data as shown in FIG. 2) is read from the memory 1. The data for 16 dots read from the memory 1 is sent to the data transmitting portion 3. Assuming that data for N dots is stored in the print scanning direction, the setup register 11 stores 4N (because m/n=4). The address counter 13 counts addresses of all dots starting from 0.

In the first print scanning operation, output data for 16 dots in storage regions A to D addressed by the address generating portion 2 is successively read from the left side. In the second print scanning operation, the ink-jet head 6 is moved in the direction perpendicular to the print scanning direction for four nozzles, and output data is successively read for 16 dots in storage regions B to E addressed by the address generating portion 2. The similar operations are repeated.

On the other hand, the masking portion 4 comprises a setup register 21 and a mask data comparing portion 22. The setup register 21 stores mask data for dispersedly selecting only output data for four dots so that dot sets selected are changed corresponding to individual print scanning operations. The mask data has been stored in the setup register 21 in such a manner that assuming that successive nozzles are denoted by 1, 2, 3, and 4, nozzles 1, 4, 2, and 3 are successively selected in four print scanning operations.

The mask data comparing portion 22 compares the mask data stored in the setup register 21 with the output data of the data transmitting portion 3. When they match and are "1", the mask data comparing portion 22 outputs data corresponding to the respective dots. The mask data may be stored in for example a ROM (Read Only Memory).

Figure 4:
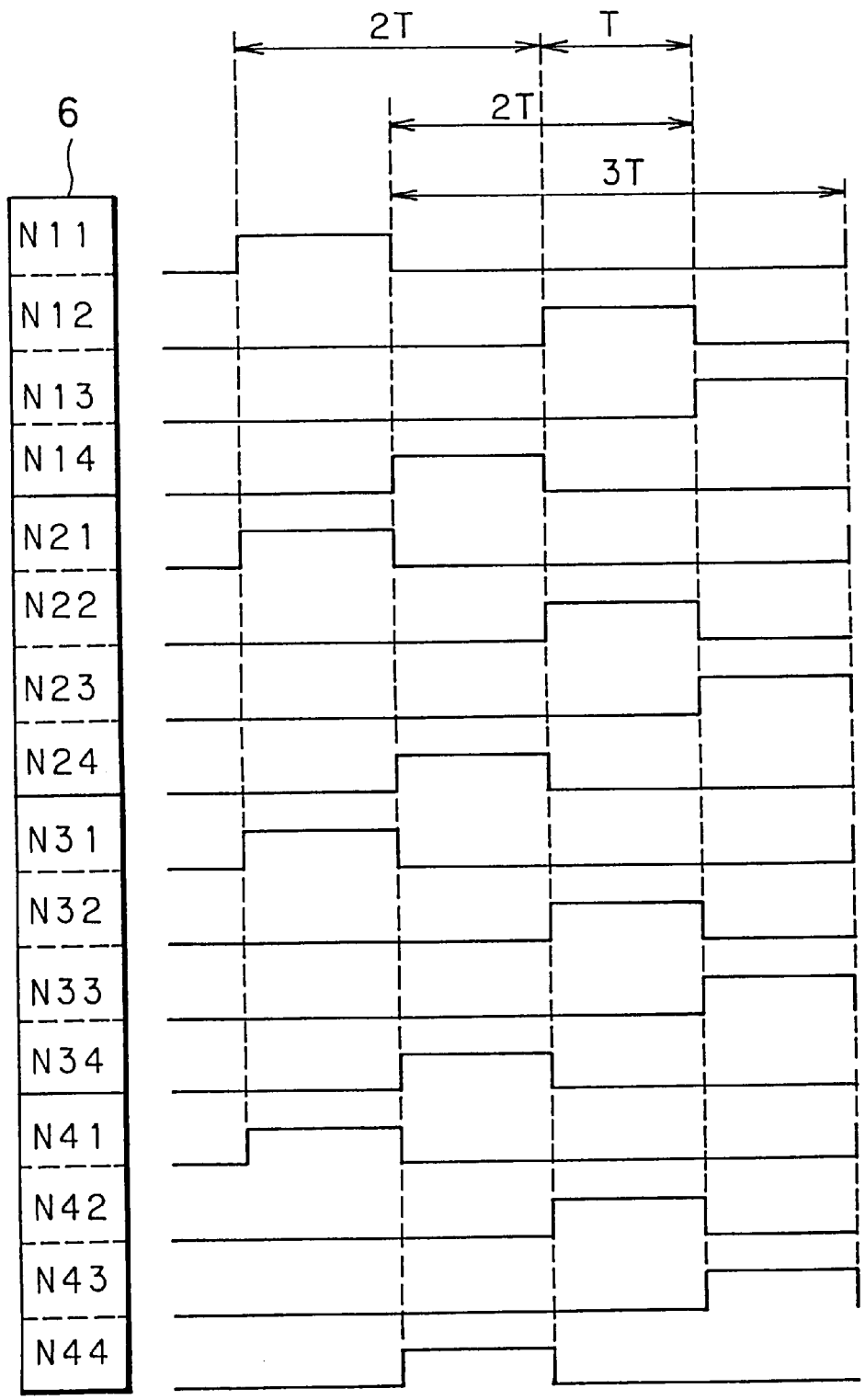
FIG. 4 is a timing chart of a four-path method according to the present invention.

As shown in FIG. 4, when four print scanning operations are performed, nozzles [N11, N21, N31, N41], [N14, N24, N34, N44], [N12, N22, N32, N42], and [N13, N23, N33, N43] are sequentially selected as enable nozzles. The time difference between adjacent nozzles Nx1 and Nx2 is 2T. The time difference between adjacent nozzles Nx2 and Nx3 is T. The time difference between adjacent nozzles Nx3 and Nx4 is 2T. The time difference between adjacent nozzles Nx4 and Nx1 is 3T. Thus, four nozzles to be enable are selected in such a manner that the time differences of drive timings of adjacent nozzles of the ink-jet head 6 become random.

Figure 5:
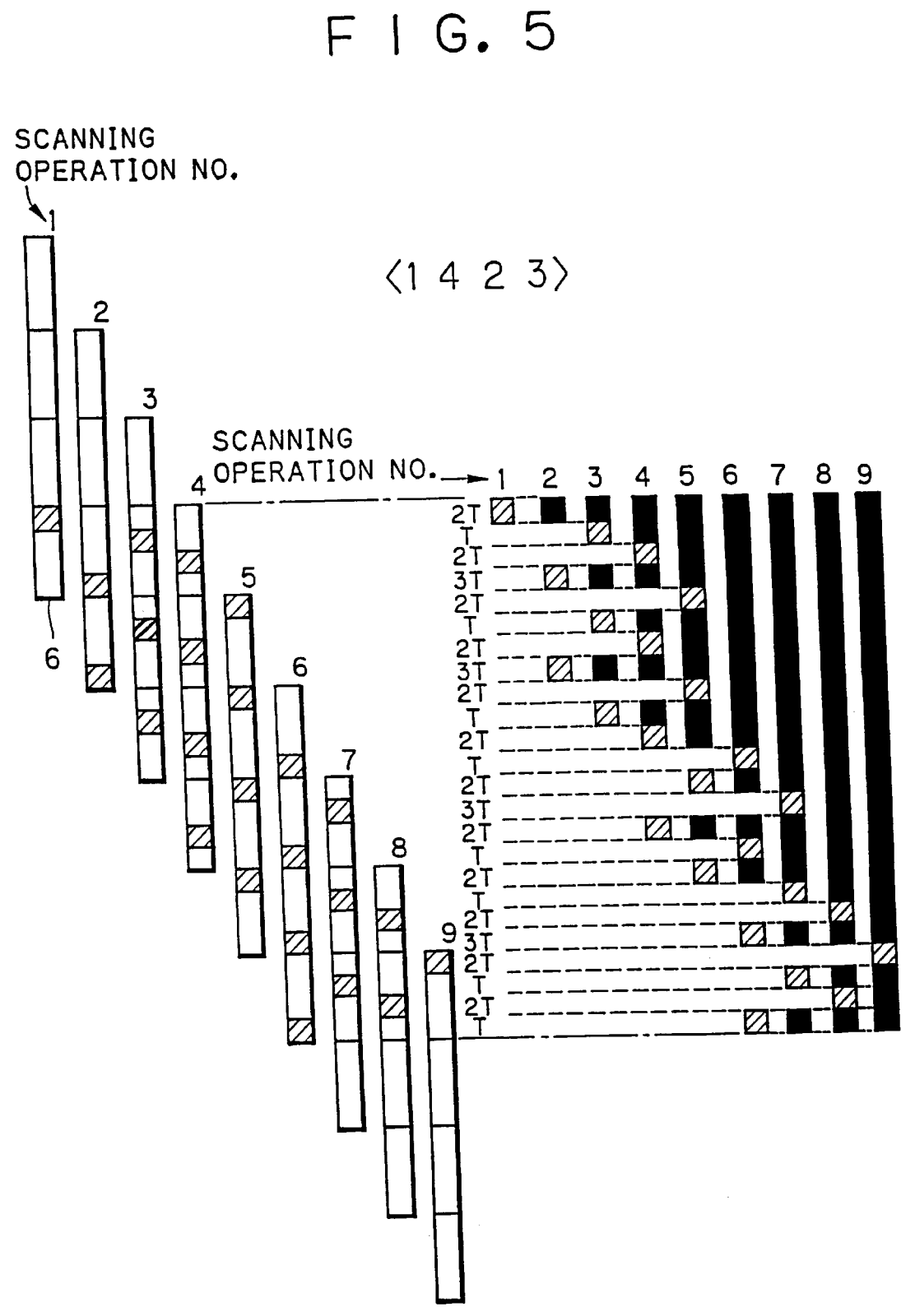

As a result, as shown in FIG. 5, the time differences of forming timings of adjacent dots become 2T, T, 2T, 3T, and so on. Consequently, the time differences of the forming timings of adjacent dots become random in the ink-jet head 6. Therefore, the mixed state of inks discharged from respective nozzles are equalized and the print output becomes free of unevenness, thereby improving the picture quality.

Figure 6B:
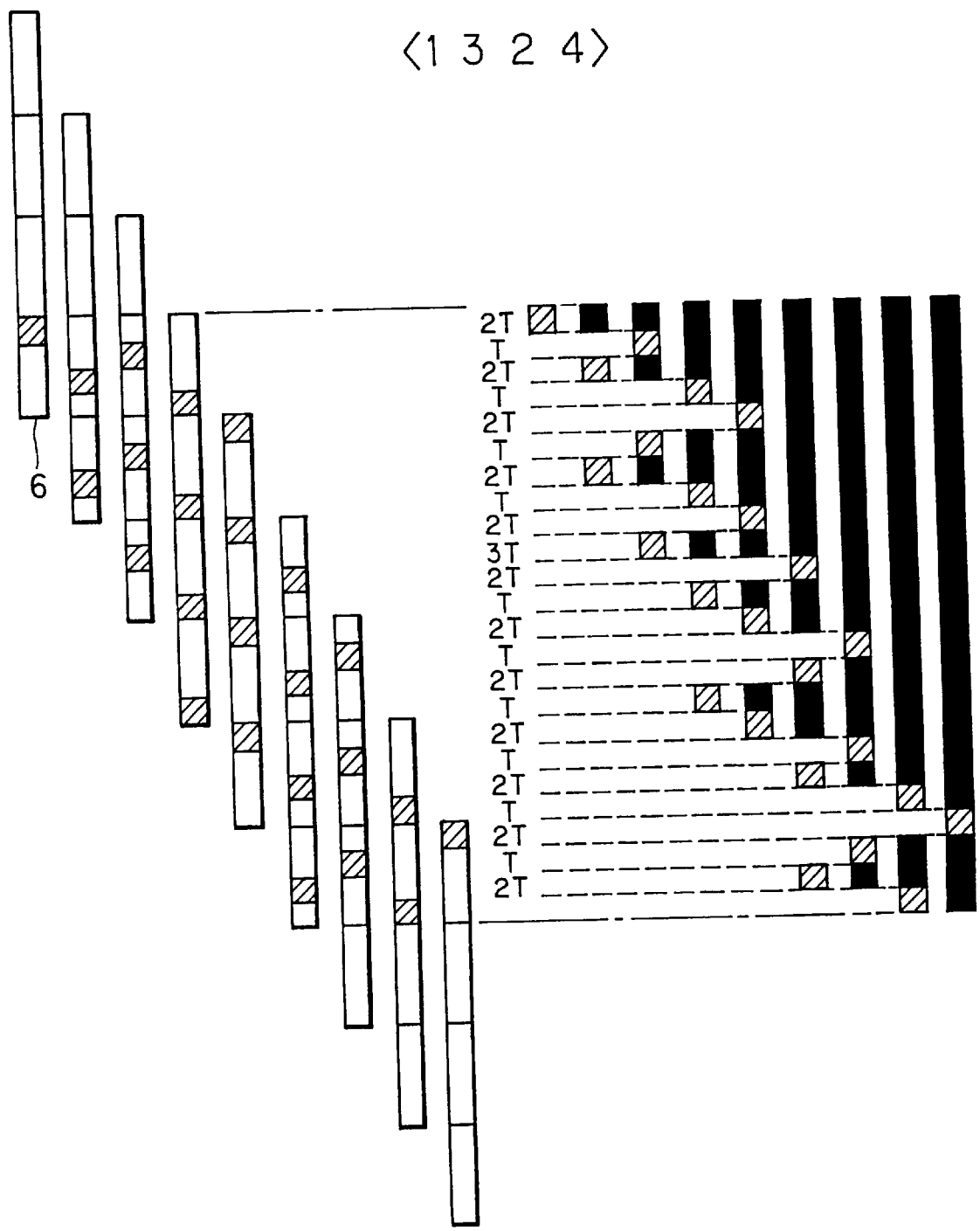
Figure 7A:
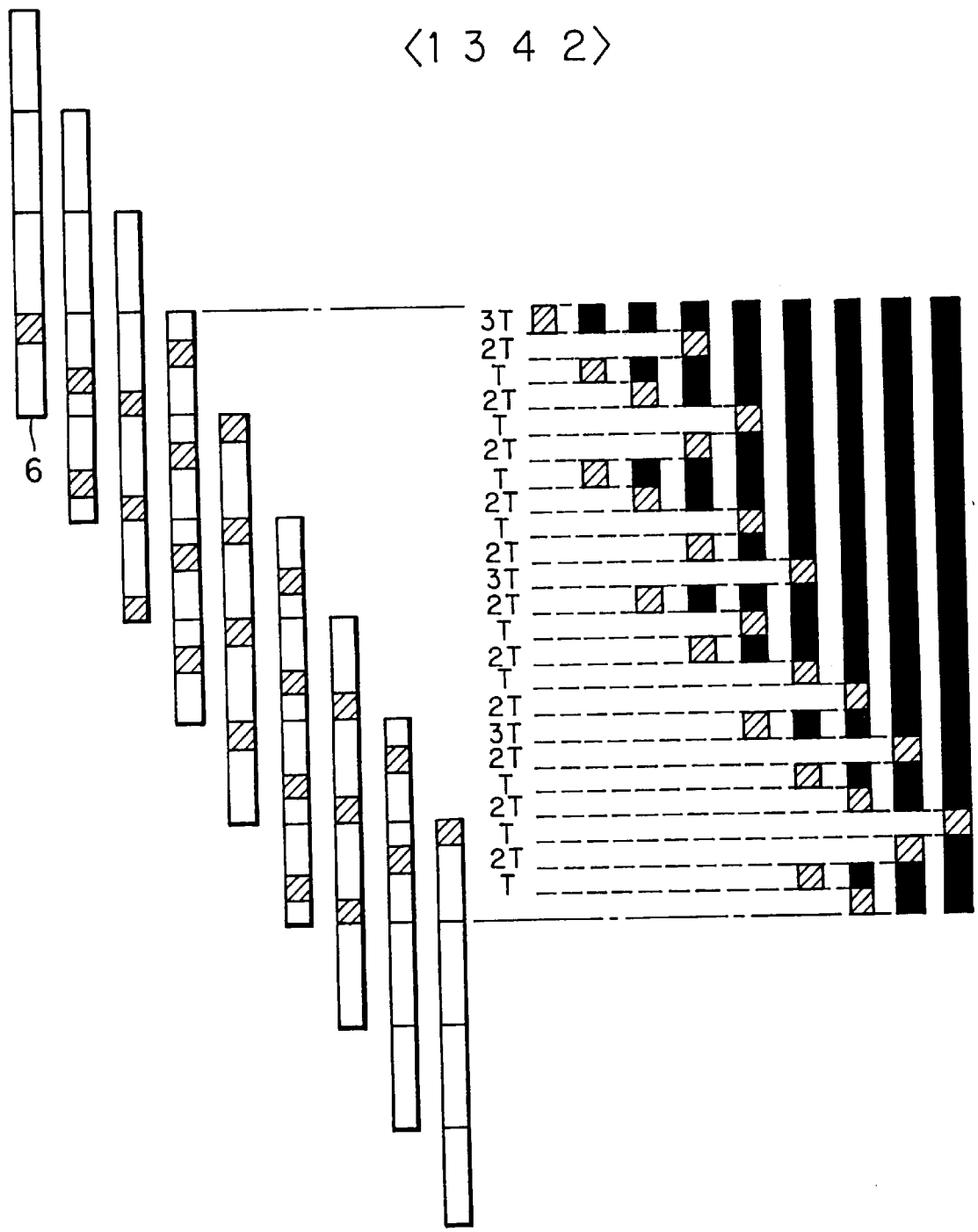
FIGS. 7A and 7B are schematic diagrams showing time differences of drive timings of adjacent nozzles according to another embodiment.
Figure 7B:
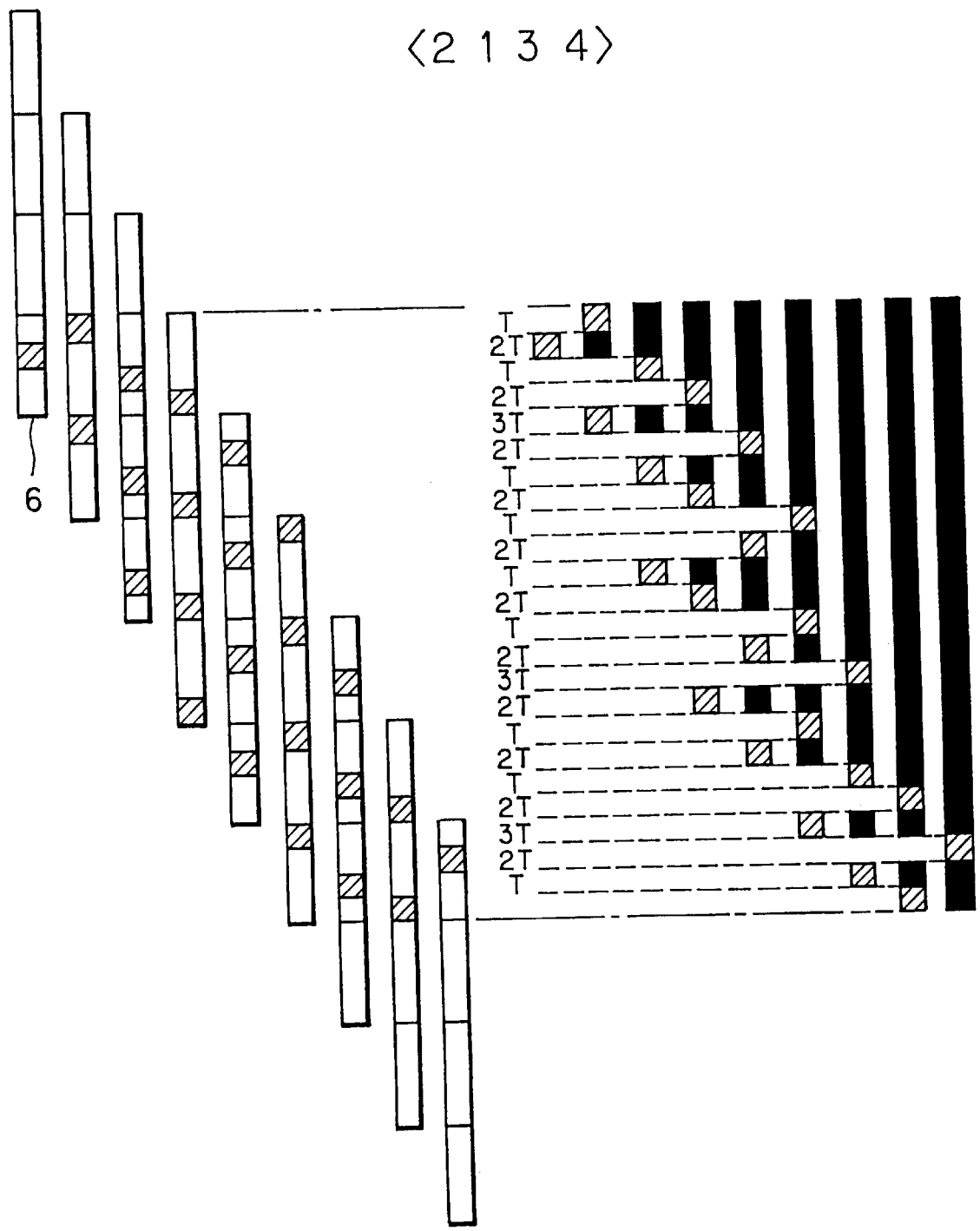
Figure 8A:
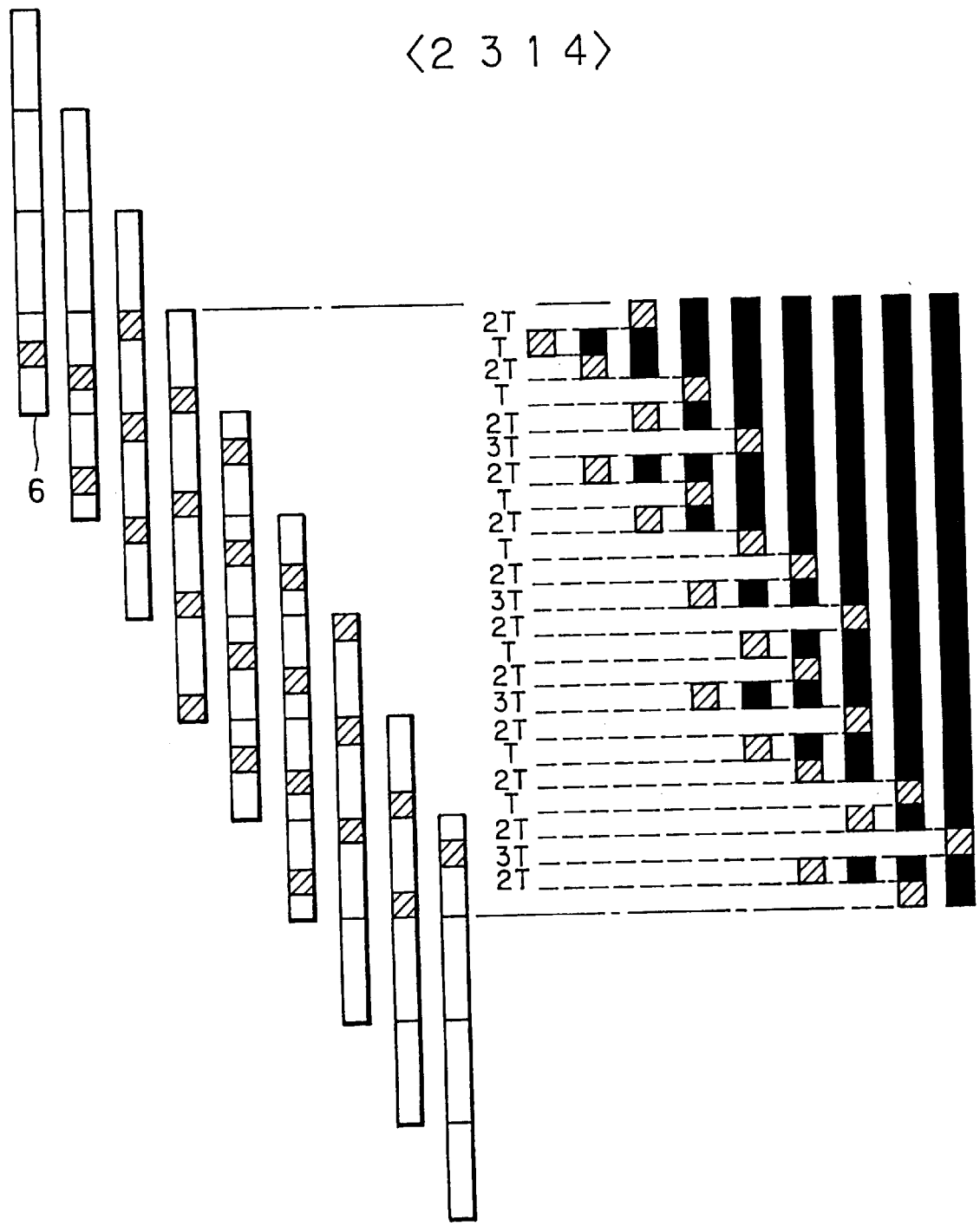
FIGS. 8A and 8B are schematic diagrams showing time differences of drive timings of adjacent nozzles according to another embodiment.
Figure 8B:
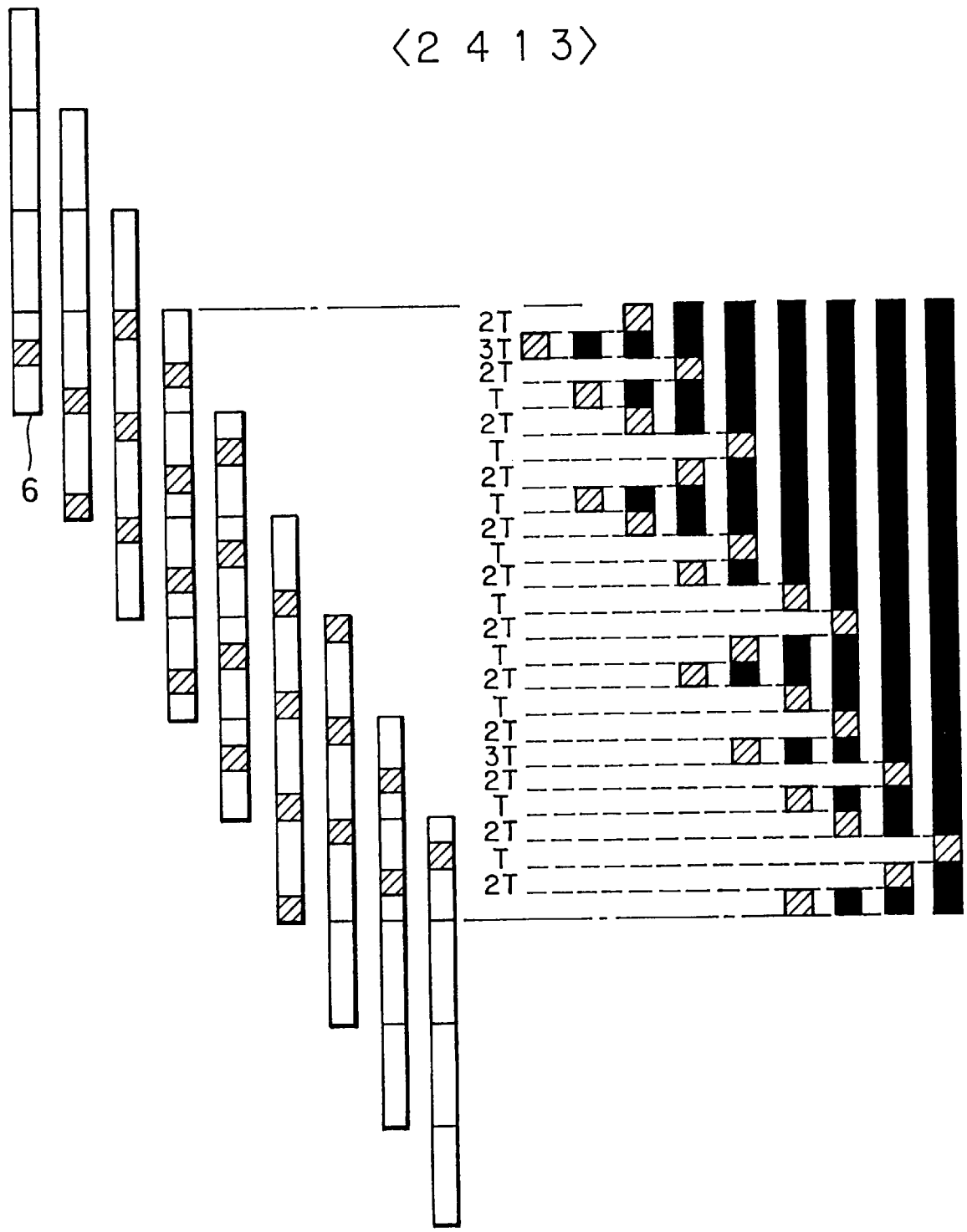
Figure 9A:
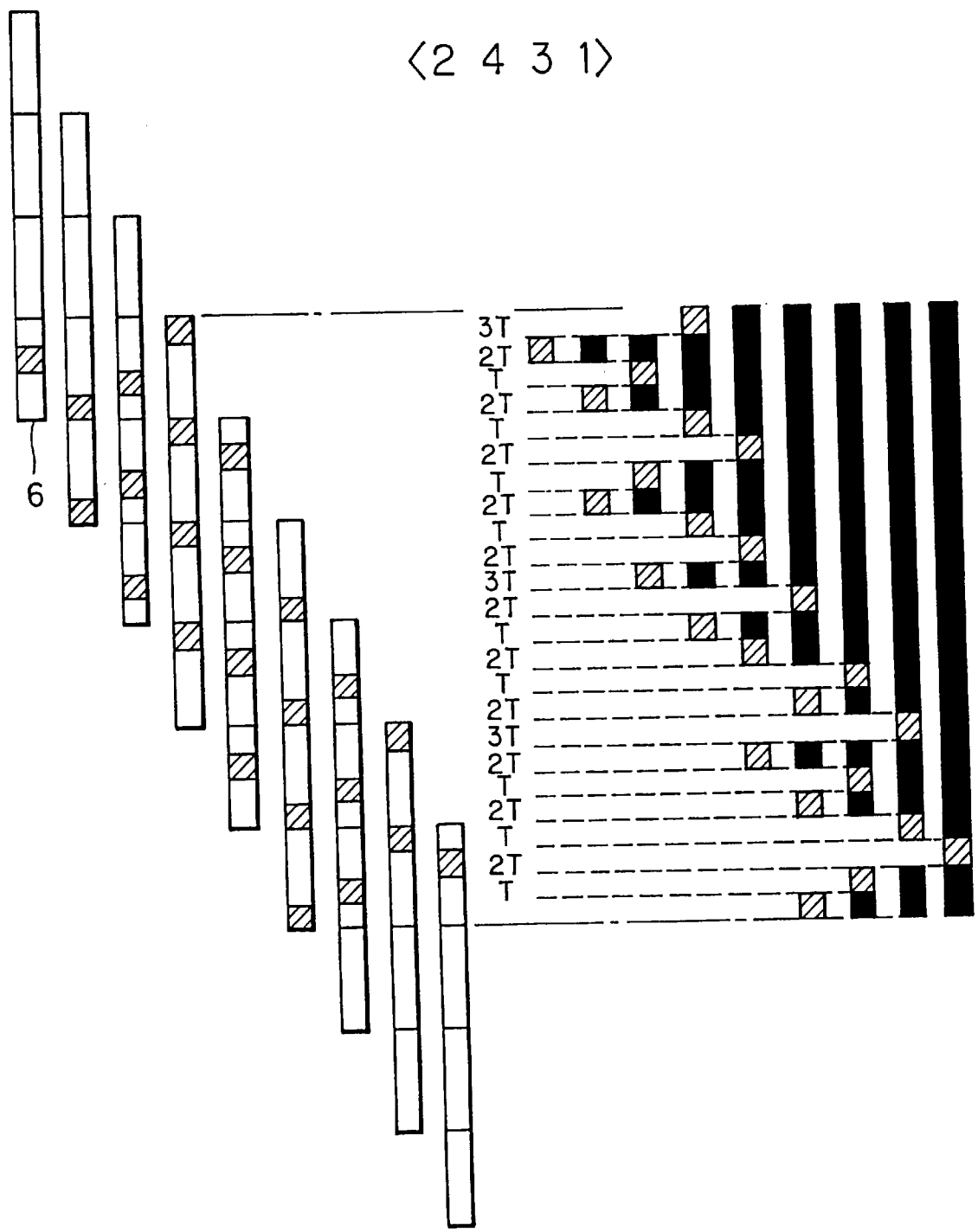
FIGS. 9A and 9B are schematic diagrams showing time differences of drive timings of adjacent nozzles according to another embodiment.
Figure 9B:
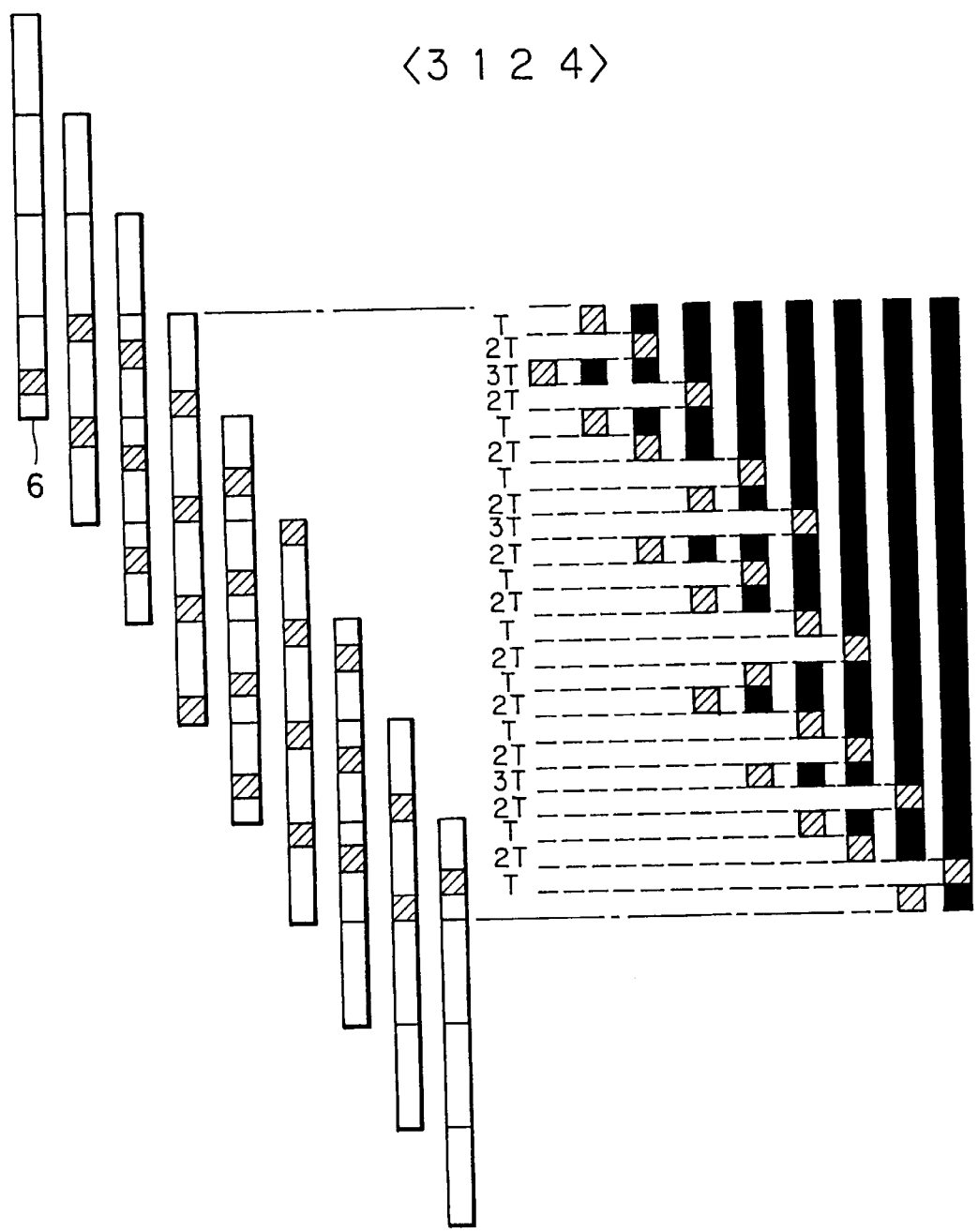
Figure 10A:
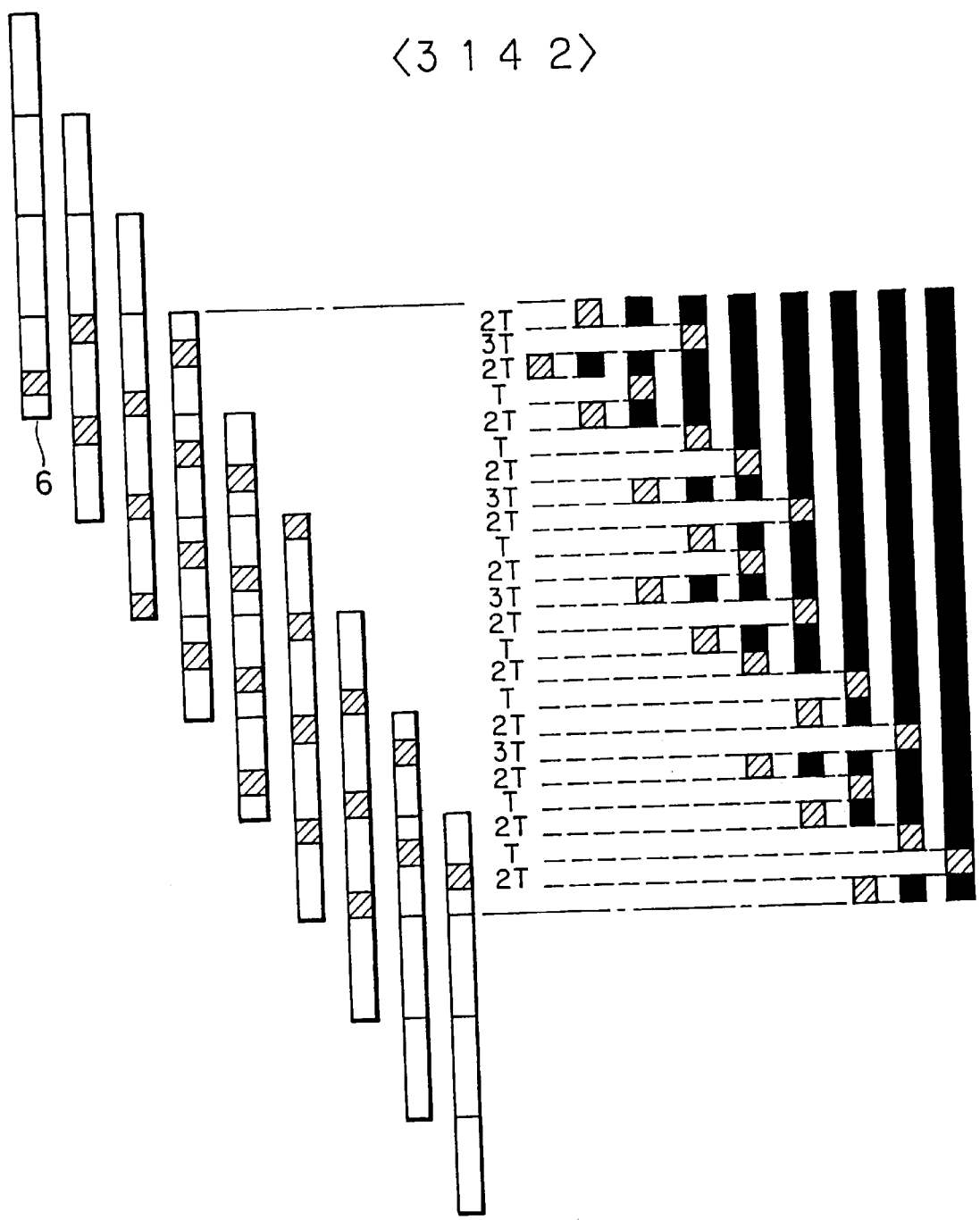
FIGS. 10A and 10B are schematic diagrams showing time differences of drive timings of adjacent nozzles according to another embodiment.
Figure 10B:
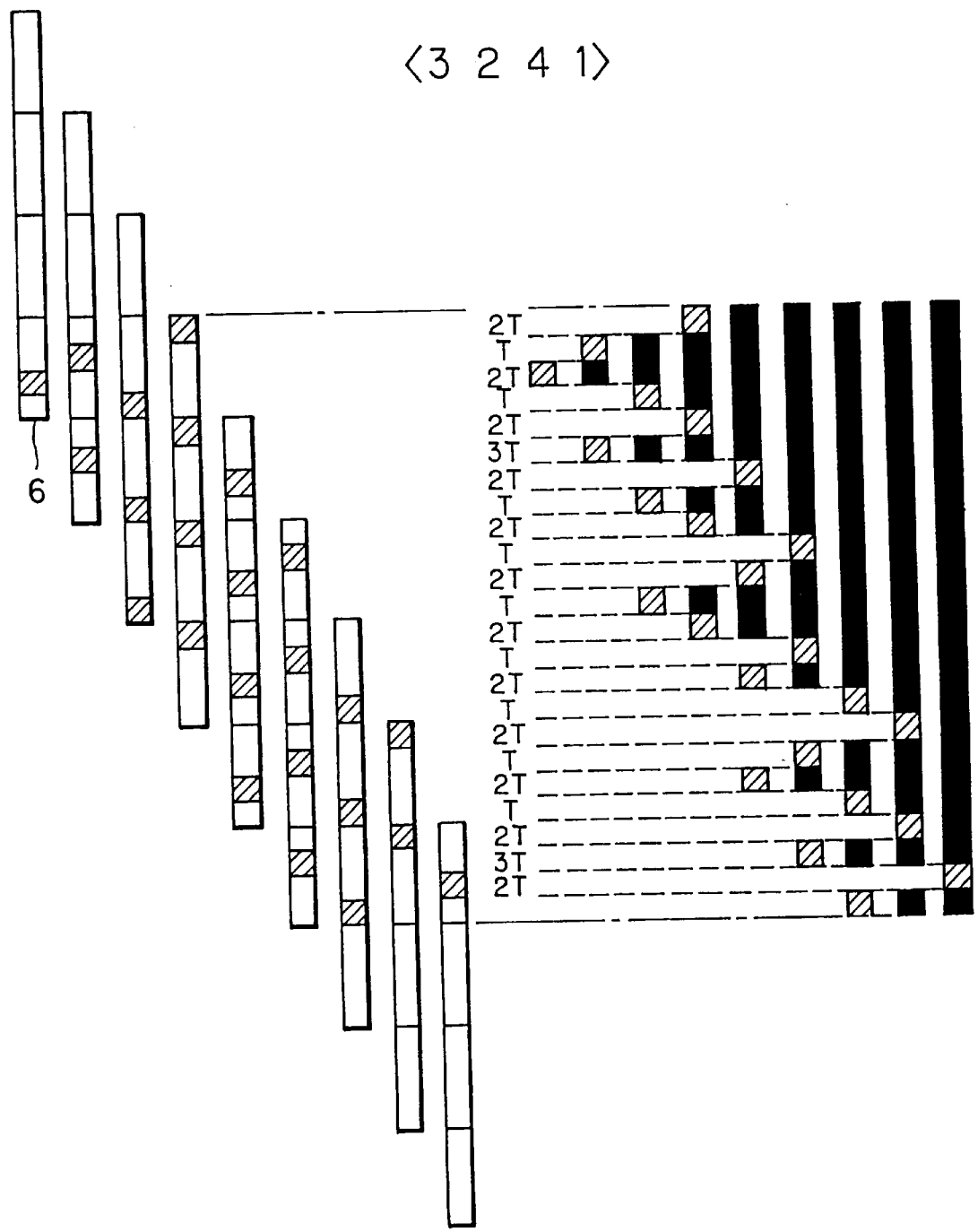
Figure 11A:
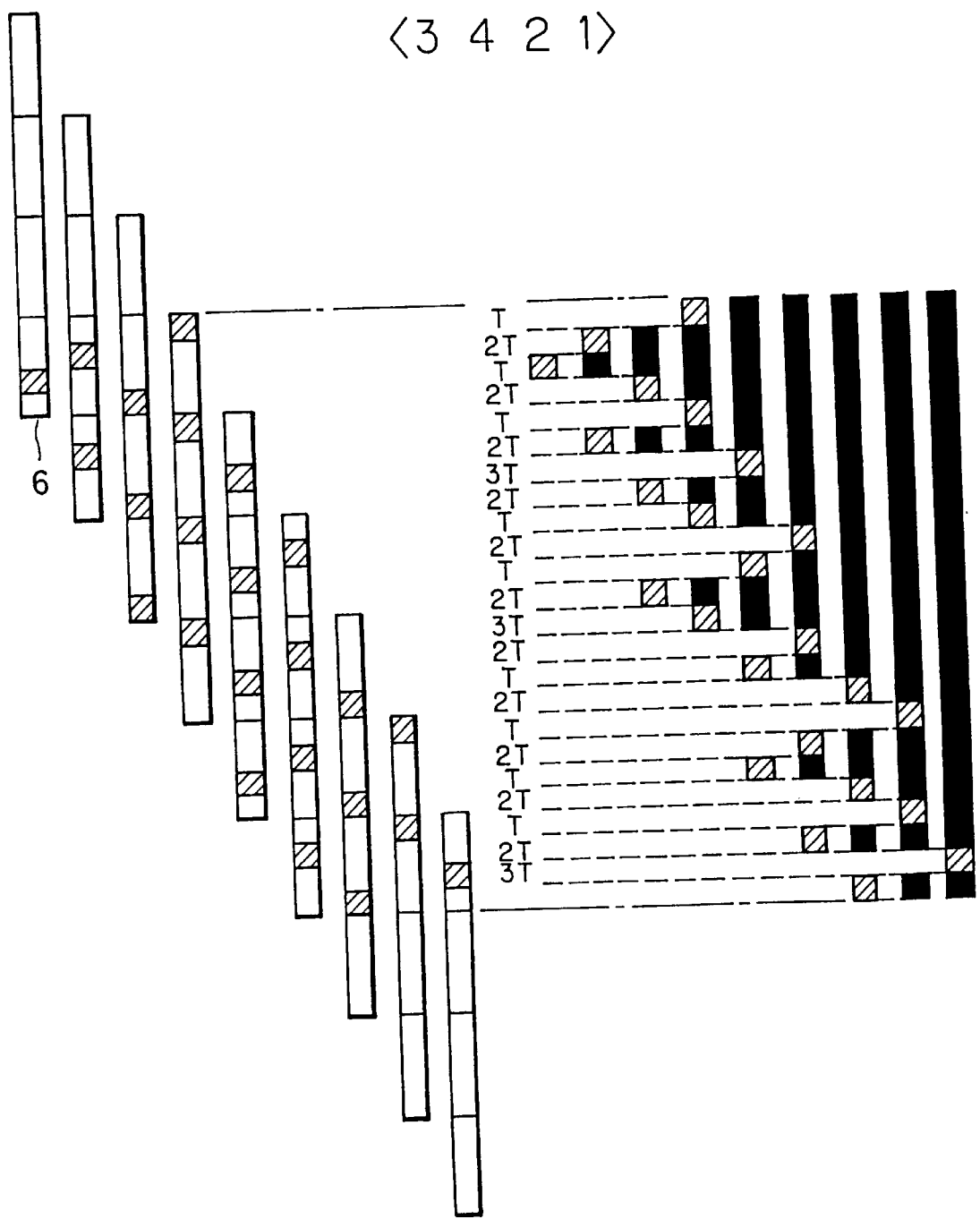
FIGS. 11A and 11B are schematic diagrams showing time differences of drive timings of adjacent nozzles according to another embodiment.
Figure 11B:
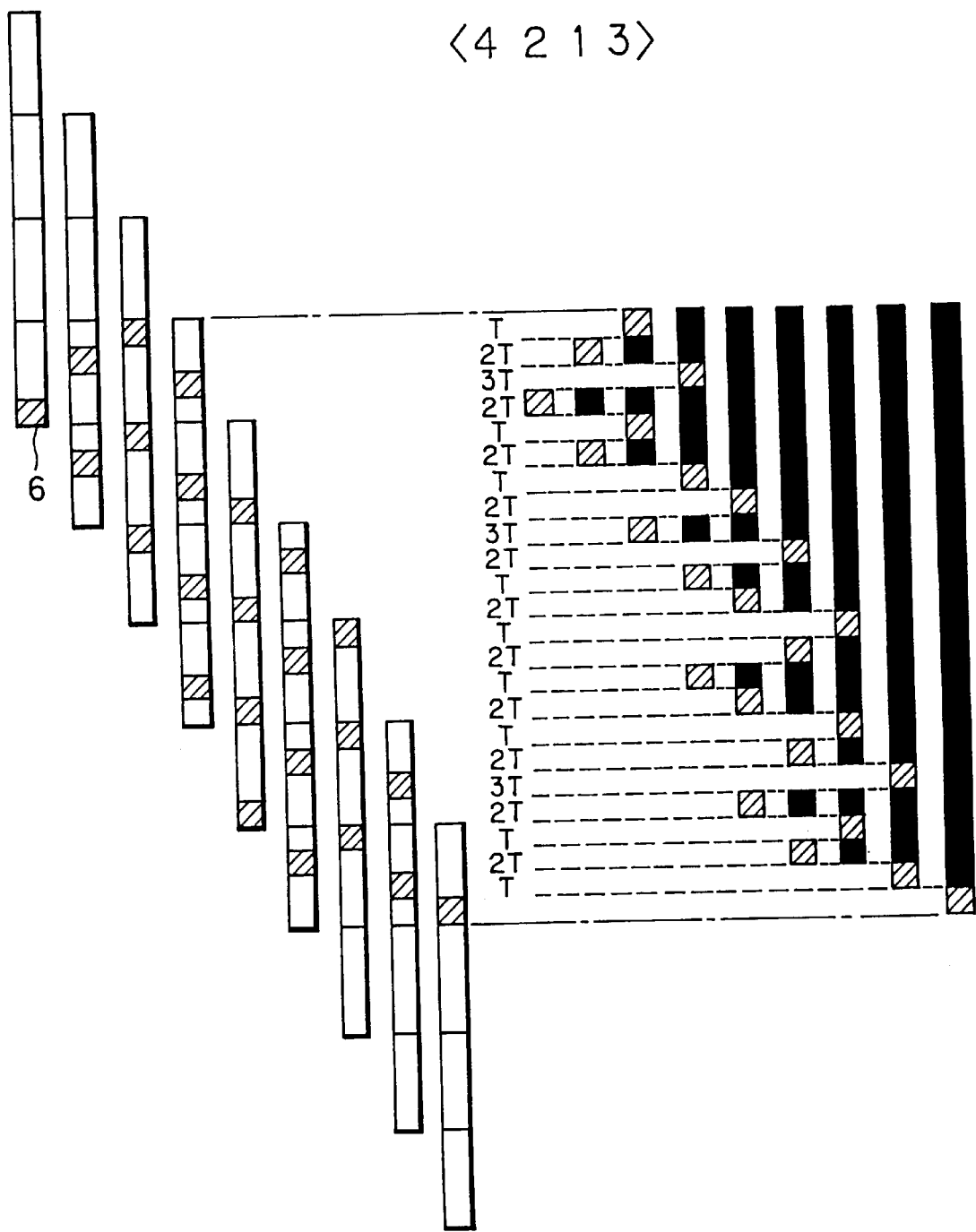
Figure 12A:
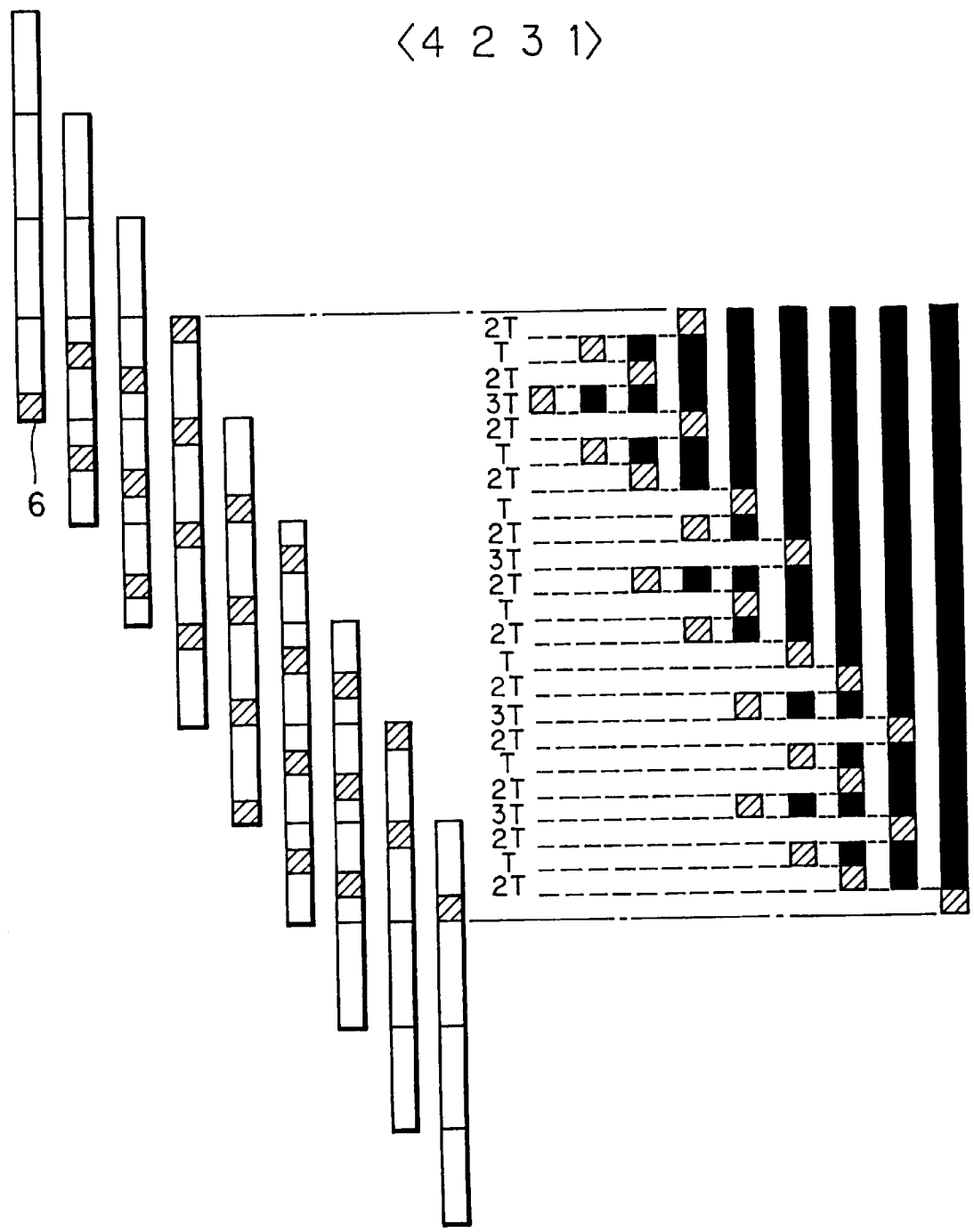
FIGS. 12A and 12B are schematic diagrams showing time differences of drive timings of adjacent nozzles according to another embodiment.
Figure 12B:
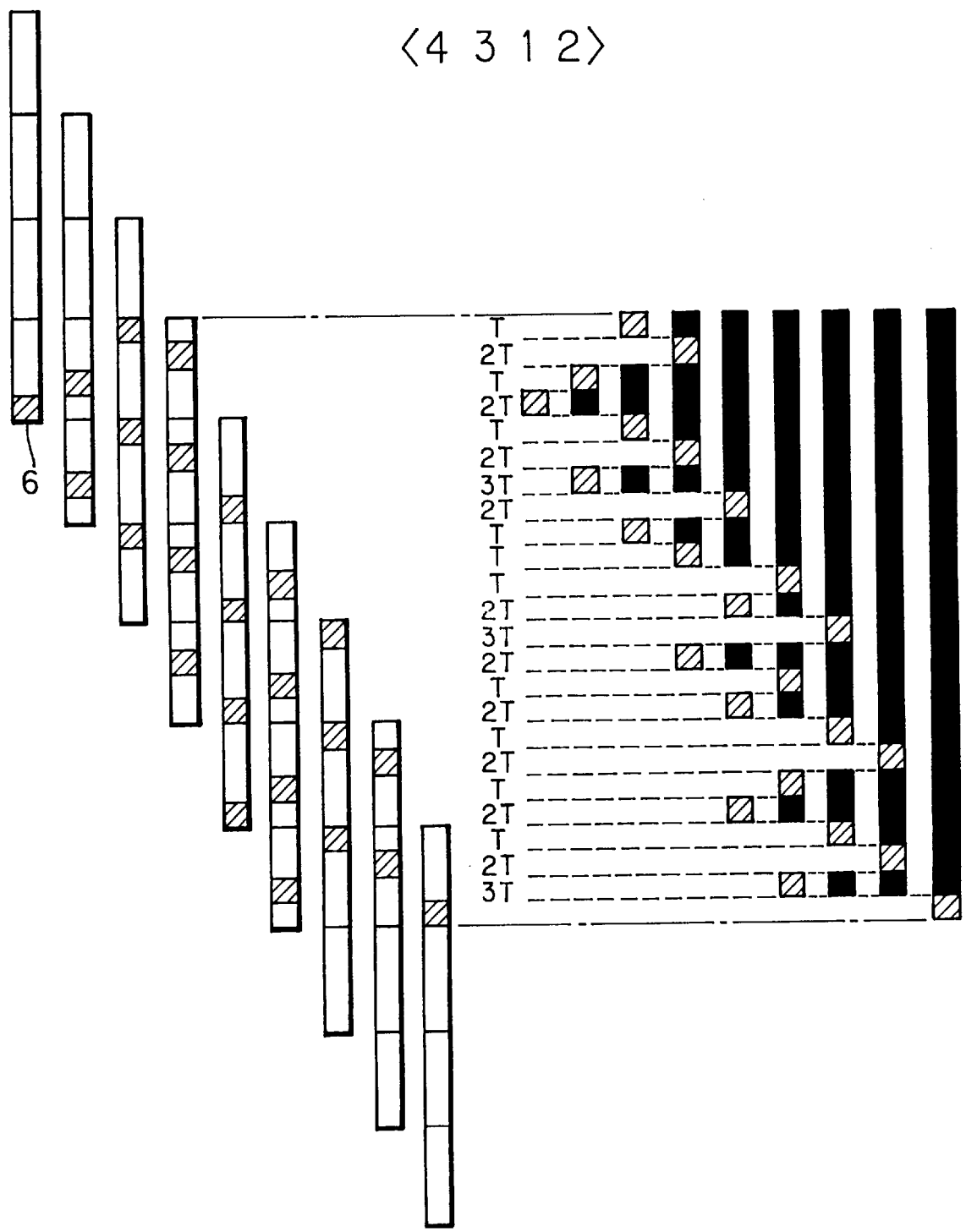
Figure 13:
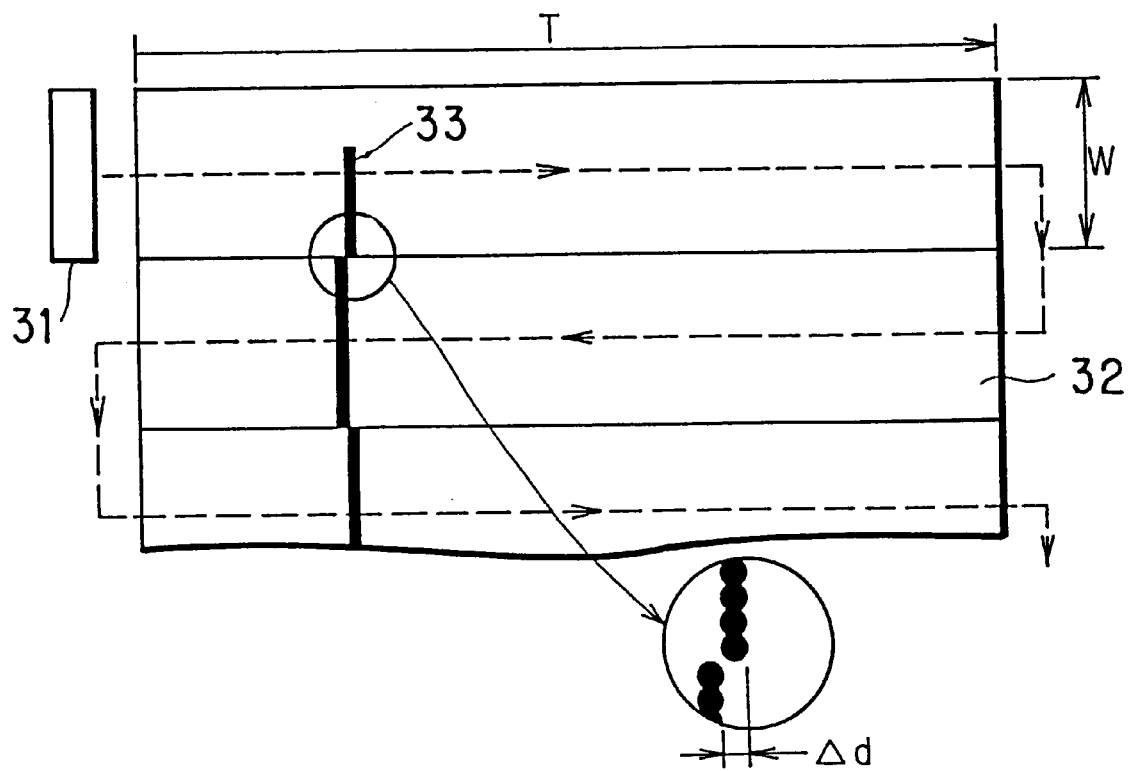
FIG. 13 is a schematic diagram showing a print output of a conventional ink-jet printing apparatus.
Figure 14:
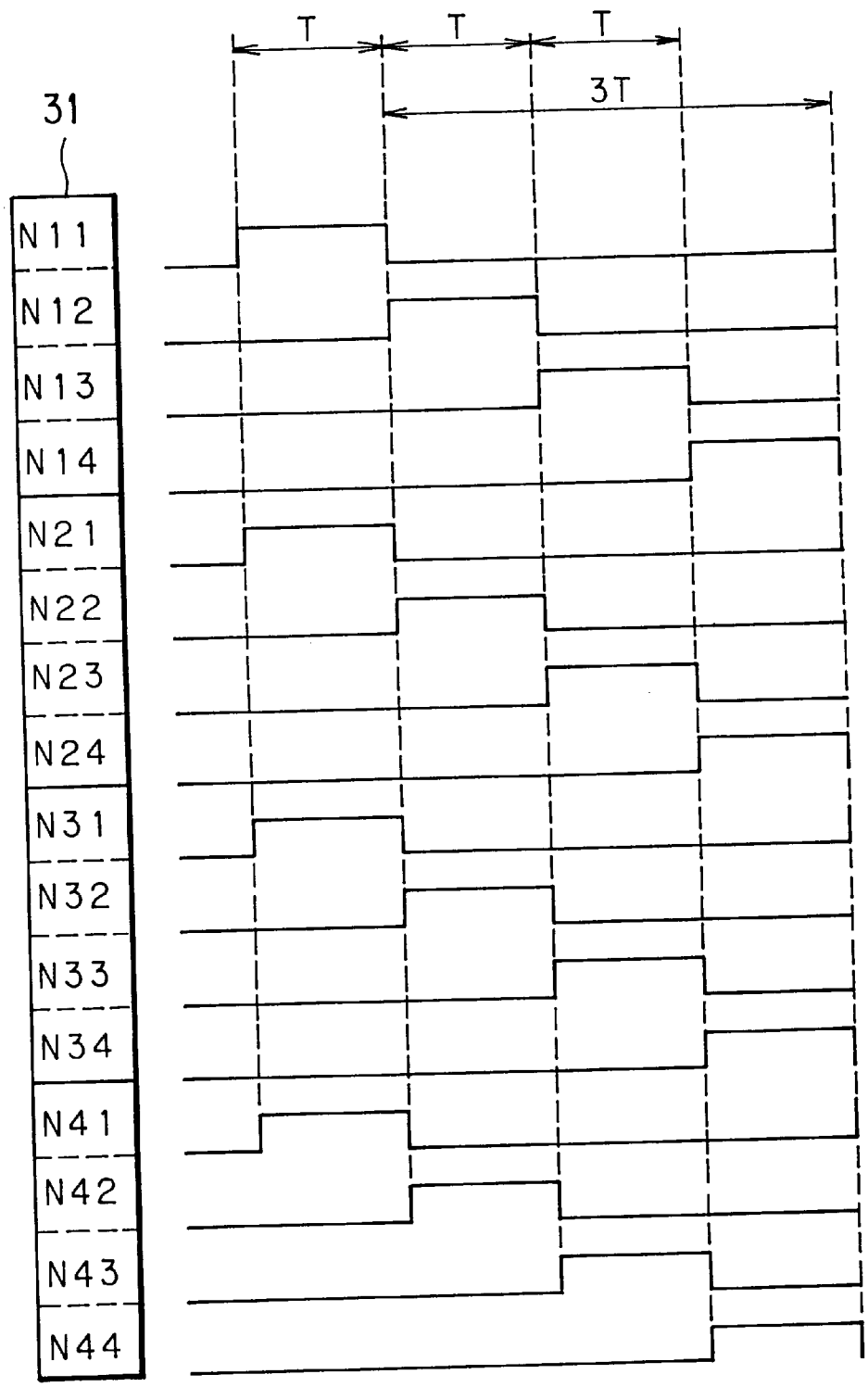
FIG. 14 is a timing chart showing a drive timing of a conventional four-path type ink-jet printing apparatus.
Figure 15A:
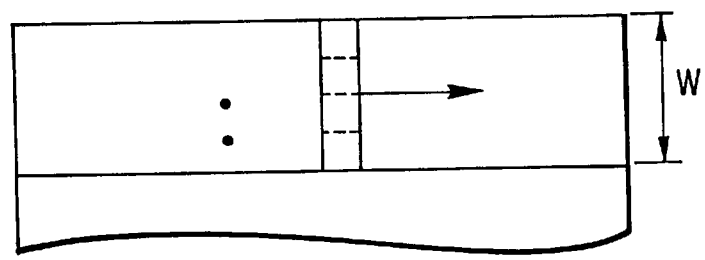
FIGS. 15A to 15D are schematic diagrams for explaining the operation of the conventional four-path type ink-jet printing apparatus.
Figure 15B:
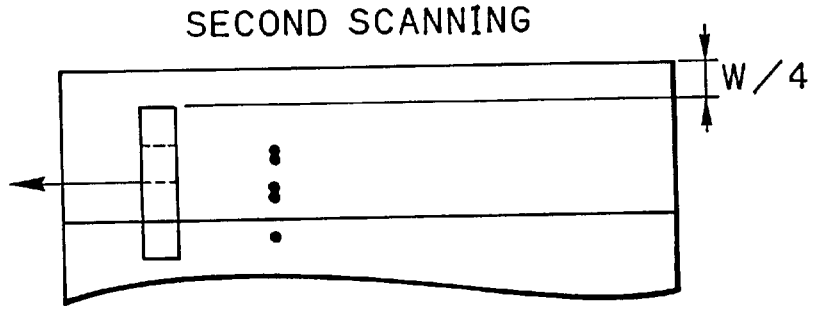
Figure 15C:
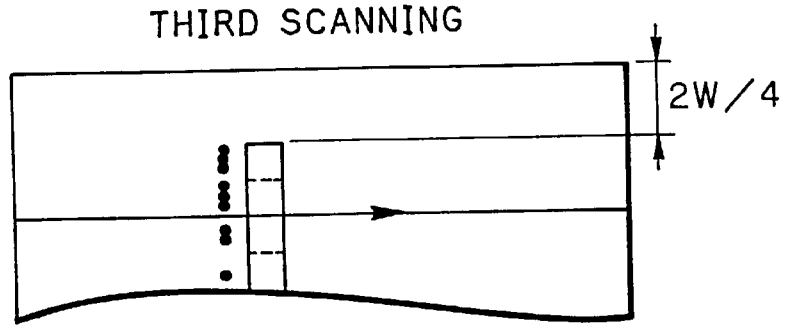
Figure 15D:
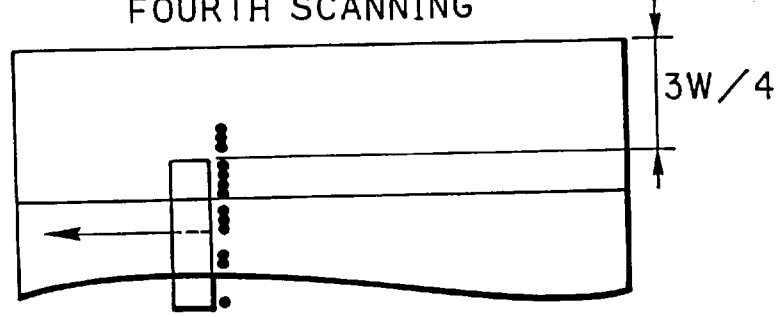
Figure 17:
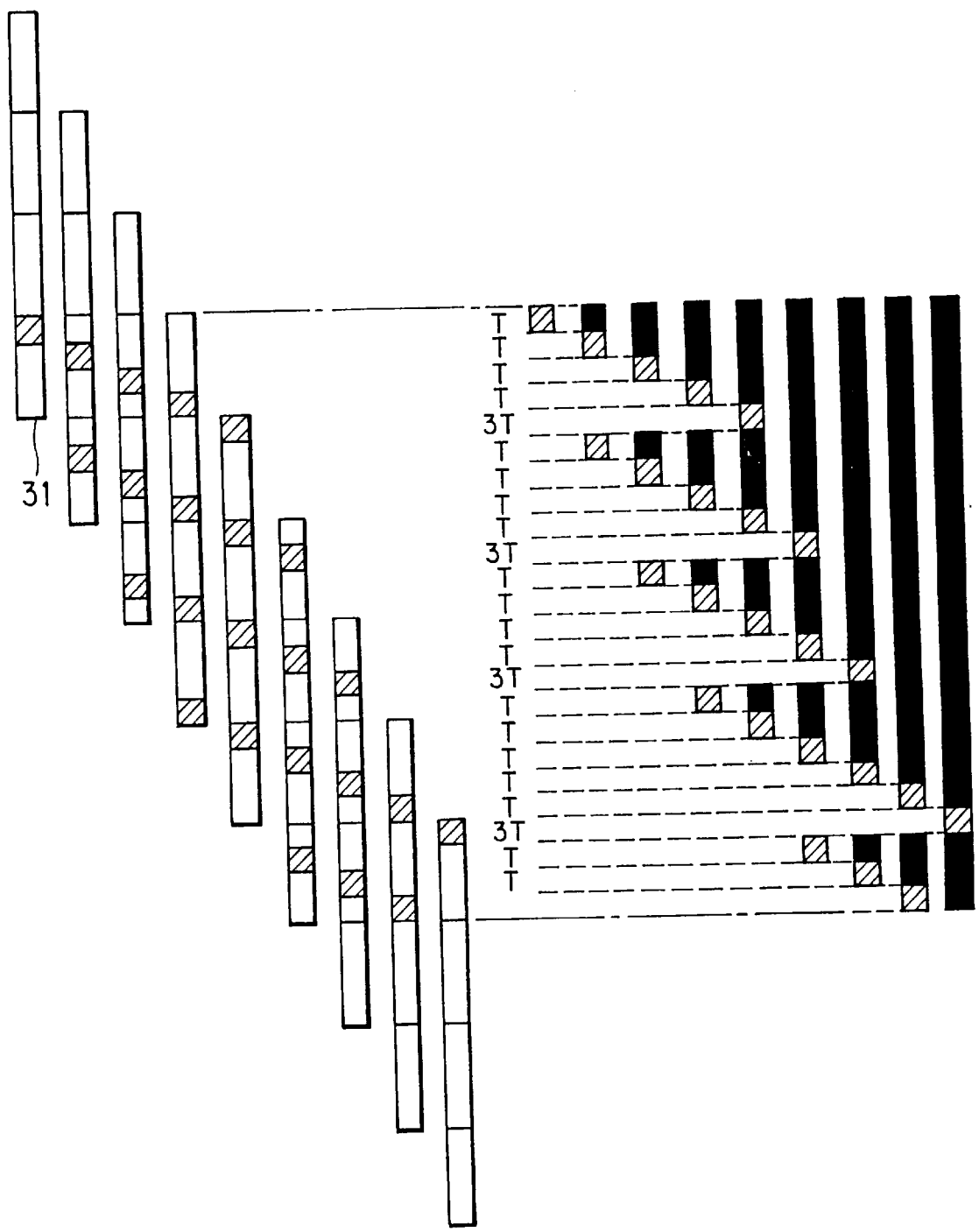
FIG. 17 is a schematic diagram for explaining the time differences of drive timings of adjacent nozzles of the conventional ink-jet printing apparatus.

The above-described embodiment is just an example. To improve the picture quality, the nozzles may be selected in the following sequences. FIG. 6A shows the case that nozzles 1, 2, 4, and 3 are sequentially set to be enable. FIG. 6B shows the case that nozzles 1, 3, 2, and 4 are sequentially set to be enable. FIG. 7A shows the case that nozzles 1, 3, 4, and 2 are sequentially set to be enable. FIG. 7B shows the case that nozzles 2, 1, 3, and 4 are sequentially set to be enable. FIG. 8A shows the case that nozzles 2, 3, 1, and 4 are sequentially set to be enable. FIG. 8B shows the case that nozzles 2, 4, 1, and 3 are sequentially set to be enable. FIG. 9A shows the case that nozzles 2, 4, 3, and 1 are sequentially set to be enable. FIG. 9B shows the case that nozzles 3, 1, 2, and 4 are sequentially set to be enable. FIG. 10A shows the case that nozzles 3, 1, 4, and 2 are sequentially set to be enable. FIG. 10B shows the case that nozzles 3, 2, 4, and 1 are sequentially set to be enable. FIG. 11A shows the case that nozzles 3, 4, 2, and 1 are sequentially set to be enable. FIG. 11B shows the case that nozzles 4, 2, 1, and 3 are sequentially set to be enable. FIG. 12A shows the case that nozzles 4, 2, 3, and 1 are sequentially set to be enable. FIG. 12B shows the case that nozzles 4, 3, 1, and 2 are sequentially set to be enable.

Referring to FIG. 6A, if nozzle numbers are shifted by 1 each, nozzles 1, 2, 4, and 3 become nozzles 2, 3, 1, and 4, respectively. In this case, in the drive sequence of nozzles in the third or later scanning operation, the nozzles 1, 4, 2, and 3 are sequentially set to be enable. Thus, it is common in FIGS. 6 to 12 that when successive nozzles are denoted by 1, 2, 3, and 4, nozzles 1, 4, 2, and 3 are sequentially selected in four print scanning operations.

In the above-described embodiment, the present invention is applied for a monochrome print output. However, the present invention can be also applied for a color print output. In particular, when the present invention is applied for a full-color print output, since output colors are largely affected by the degree of mixture of inks on a record medium. Thus, the effect for a full-color print output of the present invention is much higher than the effect of a monochrome print output. Moreover, in the above-described embodiment, for simplicity, an ink-jet printing apparatus with 16 nozzles was described. However, it should be noted that the present invention can be applied for ink-jet printing apparatuses with 64 nozzles, 98 nozzles, and so forth.

As described above, according to the present invention, m/n nozzles are selected in a multi-path system in such a manner that the time differences of drive timings of adjacent nozzles become random. Thus, inks discharged from individual nozzles are equally mixed on a record medium. Consequently, the output picture becomes free of unevenness of density and thereby the picture quality is improved.

In addition, according to the present invention, dot sets are determined by a masking means so that time differences of forming timings of adjacent dots become random in the entire ink-jet head. Thus, inks corresponding to dots can be equally mixed on the entire record medium.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A multi-path type ink-jet printing apparatus for printing data using a printing operation subdivided into a plurality of printing scanning operations, comprising:

an ink-jet head having m nozzles (where m is an integer larger than 2); and a controller for setting, for each printing operation, only m/n nozzles that are interspersedly selected from the m nozzles (where n is an integer that satisfies m>n≧2) to be enabled in one printing scanning operation, relatively moving said ink-jet head by m/n nozzles for each printing scanning operation in a direction perpendicular to a print scanning direction against a record sheet, sequentially changing a nozzle set to be driven, and printing data in the printing operation with the m nozzles using n printing scanning operations, wherein said controller selects the m/n nozzles in each print scanning operation such that time differences of drive timings of adjacent nozzles of said ink-jet head are random in said n printing scanning operations.

2. The ink-jet printing apparatus according to claim 1, wherein said controller selects said nozzles so that when four successive nozzles are denoted by 1, 2, 3, and 4, nozzles 1, 4, 2, and 3 are sequentially selected with four print scanning operations.

3. The ink-jet printing apparatus according to claim 1, wherein said controller comprises:

storing means for storing output data to be printed by said ink-jet head;

address generating means for sequentially shifting an address for m/n dots (where n is an integer that satisfies m>n≧2) in a direction perpendicular to the print scanning direction whenever each print scanning operation of said ink-jet head is performed, and generating a read address of the storing means so as to read the output data for m dots from said storing means; and masking means for interspersedly outputting data for m/n dots of m dots read from said storing means addressed by said address generating means to said ink-jet head and determining a dot set selected for each print scanning operation so that time differences of forming timings of adjacent dots become random in said ink-jet head.

4. The ink-jet printing apparatus according to claim 3, wherein said masking means comprises:

a register portion for storing mask data for interspersedly selecting only m/n dots of m dots so that a dot set being selected differs in each print scanning operation; and a mask data comparing portion for comparing the mask data stored in said register portion with output data read from said storing means and outputting the data read from said storing means when they match.

5. A multi-path type ink-jet printing apparatus for printing data using a printing operation subdivided into a plurality of printing scanning operations, comprising:

an ink-jet head having m nozzles (where m is an integer larger than 2);

storing means for storing output data to be printed by said ink-jet head;

address generating means for sequentially shifting an address for m/n dots (where n is an integer that satisfies $m > n \geq 2$) in a direction perpendicular to a printing scanning direction whenever each printing scanning operation is performed, and generating a read address of said storing means so as to read the output data for m dots from said storing means; and masking means for interspersedly outputting data, for m/n dots of m dots read from said storing means and addressed by said address generating means, to said ink-jet head and determining a dot set selected for each printing operation so that time differences of forming timings of adjacent dots are random in n scanning operations.

6. The ink-jet printing apparatus according to claim 5, wherein said masking means masks the output data in such a manner that when four successive nozzles are denoted by 1, 2, 3, and 4, dots are sequentially formed by the nozzles 1, 4, 2, and 3 with four print scanning operations.

* * * * *